United States Patent
Elwell et al.

(10) Patent No.: US 10,860,312 B1
(45) Date of Patent: *Dec. 8, 2020

(54) DEFECT OWNERSHIP ASSIGNMENT SYSTEM AND PREDICTIVE ANALYSIS FOR CODEBASES

(71) Applicant: INTUIT INC., Mountain View, CA (US)

(72) Inventors: Joseph Elwell, San Diego, CA (US); Damien O'Malley, San Diego, CA (US); Dharin Nanavati, San Diego, CA (US); Aliza Carpio, San Diego, CA (US)

(73) Assignee: INTUIT, INC., Mountain View, CA (US)

(*) Notice: Subject to any disclaimer, the term of this patent is extended or adjusted under 35 U.S.C. 154(b) by 70 days.

This patent is subject to a terminal disclaimer.

(21) Appl. No.: 16/205,535

(22) Filed: Nov. 30, 2018

Related U.S. Application Data

(63) Continuation of application No. 15/417,916, filed on Jan. 27, 2017, now Pat. No. 10,175,979.

(51) Int. Cl.
  G06F 8/71 (2018.01)
  G06N 20/00 (2019.01)

(52) U.S. Cl.
  CPC .............. *G06F 8/71* (2013.01); *G06N 20/00* (2019.01)

(58) Field of Classification Search
  None
  See application file for complete search history.

(56) References Cited

U.S. PATENT DOCUMENTS

| | | | |
|---|---|---|---|
| 6,606,744 B1* | 8/2003 | Mikurak | H04L 29/06 717/174 |
| 7,870,540 B2* | 1/2011 | Zare | G06F 11/3604 717/109 |
| 8,225,302 B2* | 7/2012 | Waugh | G06F 11/3616 717/122 |
| 9,208,056 B1* | 12/2015 | Henriksen | G06F 8/73 |
| 9,424,164 B2* | 8/2016 | Bates | G06F 11/3624 |
| 9,542,176 B2* | 1/2017 | Bird | G06F 8/71 |
| 9,626,283 B1* | 4/2017 | Zlatnik | G06Q 10/06 |
| 9,652,713 B2* | 5/2017 | Hunt | G06N 3/105 |
| 9,690,690 B1* | 6/2017 | Henriksen | G06F 11/3604 |
| 9,785,432 B1* | 10/2017 | Wright | G06Q 10/06398 |
| 9,824,002 B2* | 11/2017 | Shann | G06F 11/3664 |
| 2006/0190923 A1* | 8/2006 | Jubran | G06F 8/20 717/104 |
| 2008/0295085 A1* | 11/2008 | Rachamadugu | G06F 8/75 717/159 |
| 2009/0070734 A1* | 3/2009 | Dixon | G06F 8/71 717/102 |
| 2009/0138843 A1* | 5/2009 | Hinton | G06F 8/74 717/101 |
| 2010/0325619 A1* | 12/2010 | Song | G06F 8/443 717/143 |

(Continued)

*Primary Examiner* — Isaac T Tecklu
(74) *Attorney, Agent, or Firm* — Patterson & Sheridan LLP

(57) ABSTRACT

The present disclosure relates to a system and method for evaluating source code. The system generates training data from a plurality of defect records that identify developers who fixed defects. The system recommends developers for repairing defects in software features using a machine learning algorithm configured using elements from the defect records and the code related to the defect records.

17 Claims, 6 Drawing Sheets

(56) References Cited

U.S. PATENT DOCUMENTS

| | | | |
|---|---|---|---|
| 2011/0066908 A1* | 3/2011 | Bartz | G06F 11/0709 714/746 |
| 2011/0154109 A1* | 6/2011 | Levine | G06F 8/70 714/26 |
| 2012/0167060 A1* | 6/2012 | Landwehr | G06F 11/3604 717/132 |
| 2013/0036400 A1* | 2/2013 | Bak | G06F 8/71 717/101 |
| 2013/0332902 A1* | 12/2013 | Wang | G06F 8/38 717/122 |
| 2015/0309790 A1* | 10/2015 | Henriksen | G06F 8/77 717/121 |
| 2016/0004517 A1* | 1/2016 | Safary | G06F 8/436 717/131 |
| 2016/0239295 A1* | 8/2016 | Kolesnik | G06F 8/71 |
| 2016/0266896 A1* | 9/2016 | Fan | G06F 8/33 |
| 2017/0212829 A1* | 7/2017 | Bales | G06F 11/3664 |
| 2017/0357809 A1* | 12/2017 | Smith | G06F 8/75 |
| 2017/0371763 A1* | 12/2017 | Haiderzaidi | G06F 11/3604 |
| 2018/0005153 A1* | 1/2018 | Ferguson, IV | G06Q 10/06311 |
| 2018/0074936 A1* | 3/2018 | Broadbent | G06F 11/36 |

\* cited by examiner

DEFECT OWNERSHIP ASSIGNMENT SYSTEM AND PREDICTIVE ANALYSIS FOR CODEBASES

RELATED APPLICATIONS

The present patent is a continuation of, and hereby claims priority under 35 U.S.C. § 120 to pending U.S. patent application Ser. No. 15/417,916, entitled "DEFECT OWNERSHIP ASSIGNMENT SYSTEM AND PREDICTIVE ANALYSIS FOR CODEBASES," by the same inventors, filed on 27 Jan. 2017.

BACKGROUND

Field

Embodiments presented herein generally relate to assigning responsibility for programming errors, and more specifically to assigning ownership to of errors introduced into a code base and predicting code errors using individual error analysis.

Description of the Related Art

Generally, software development projects involving large code bases use a team of software developers directed by a manager to create and maintain the code base. With large projects, it is hard to determine the developer who introduces a programming error, i.e., a "defect," into the codebase. Repairing defects can take significant amounts of developer time, so it is desirable to be able to predict how many and what type of defects will be present in a new or revised portion of code.

One approach is to rely on the manager responsible for the project to estimate the number and type of defects in a project based on the manager's experience with the individual software developers. The manager's assessment is subjective and therefore vulnerable to bias and generalizations of prior work by individual developers. Further, the manager's subjective assessment requires a significant amount of time to develop and is not easily transferable to other managers. The long lead time to generate an assessment and the difficulty in transferring that knowledge impose a high transition cost when managers or developers are staffed to other projects or depart altogether. Therefore, it is desirable to have a system that can quantify the performance of developers and make predictions about the number and type of defects in a software project.

SUMMARY

One embodiment of the present disclosure includes a method for predicting errors in a code base. The method generates a first element set from a plurality of defect records, where each defect record includes a developer identifier associating a developer as the originator of the defect, a first code revision, a second code revision and a defect classification. The method generates a second element set from at least one of the first and second code revisions, and generates an error prediction. The error prediction is generated by evaluating a software program using a machine learning algorithm with the first and second element sets.

Another embodiment provides a computer-readable storage medium having instructions, which, when executed on a processor, operates to predict errors in a code base. The processor generates a first element set from a plurality of defect records, where each defect record includes a developer identifier associating a developer as the originator of the defect, a first code revision, a second code revision and a defect classification. The processor generates a second element set from at least one of the first and second code revisions, and generates an error prediction. The error prediction is generated by evaluating a software program using a machine learning algorithm with the first and second element sets.

Still another embodiment of the present invention includes a processor and a memory storing a program, which, when executed on the processor, performs an operation for predicting errors in a code base. The processor generates a first element set from a plurality of defect records, where each defect record includes a developer identifier associating a developer as the originator of the defect, a first code revision, a second code revision and a defect classification. The processor generates a second element set from at least one of the first and second code revisions, and generates an error prediction. The error prediction is generated by evaluating a software program using a machine learning algorithm with the first and second element sets.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Generally, when teams of engineers develop large software applications code is frequently developed in a collaborative manner, with developers working in overlapping portions of the code. This collaboration between developers makes it difficult to determine patterns for individual developers, i.e., who is bad at ascertaining which type of code issue that result in code defects.

Existing software development processes largely rely on the knowledge of individual managers regarding which software developers tend to introduce what type of software defects and which developers are better at fixing certain types of software defects. Thus, managers tend to assign developers to fix defects based on the manager's subjective perception of the developers on a team and what types of defects team members are good at fixing. Relying on an individual's knowledge, however, can be problematic when managers are reassigned to different positions or depart the company, because the personal knowledge is either lost or needs to be transferred to the new manager. Transferring such knowledge, when possible, is difficult because it is largely based on the departing manager's intangible assessments developed over time. For the same reason, a new manager may require substantial amount of time to develop opinions regarding team members.

Embodiments presented here provide techniques for efficiently assigning developers to resolve defects. In one embodiment, machine learning approaches are used to assess developer performance and to predict the number and type of defects likely to be present in a feature as well as the most effective developers for resolving the defects. The system links each software issue tracked by a version control system to an originating developer. The system quantifies the defect using metadata about the defect fix and analysis of the related code. The system creates a model that predicts the number and type of defects likely present in a new software feature based on the developer who wrote the feature code, as well as which developers are the most efficient at resolving the defects. The system, therefore, both quantifies the effectiveness of developers and maintains an evolving model for efficiently resolving defects in software development projects.

Figure 1:
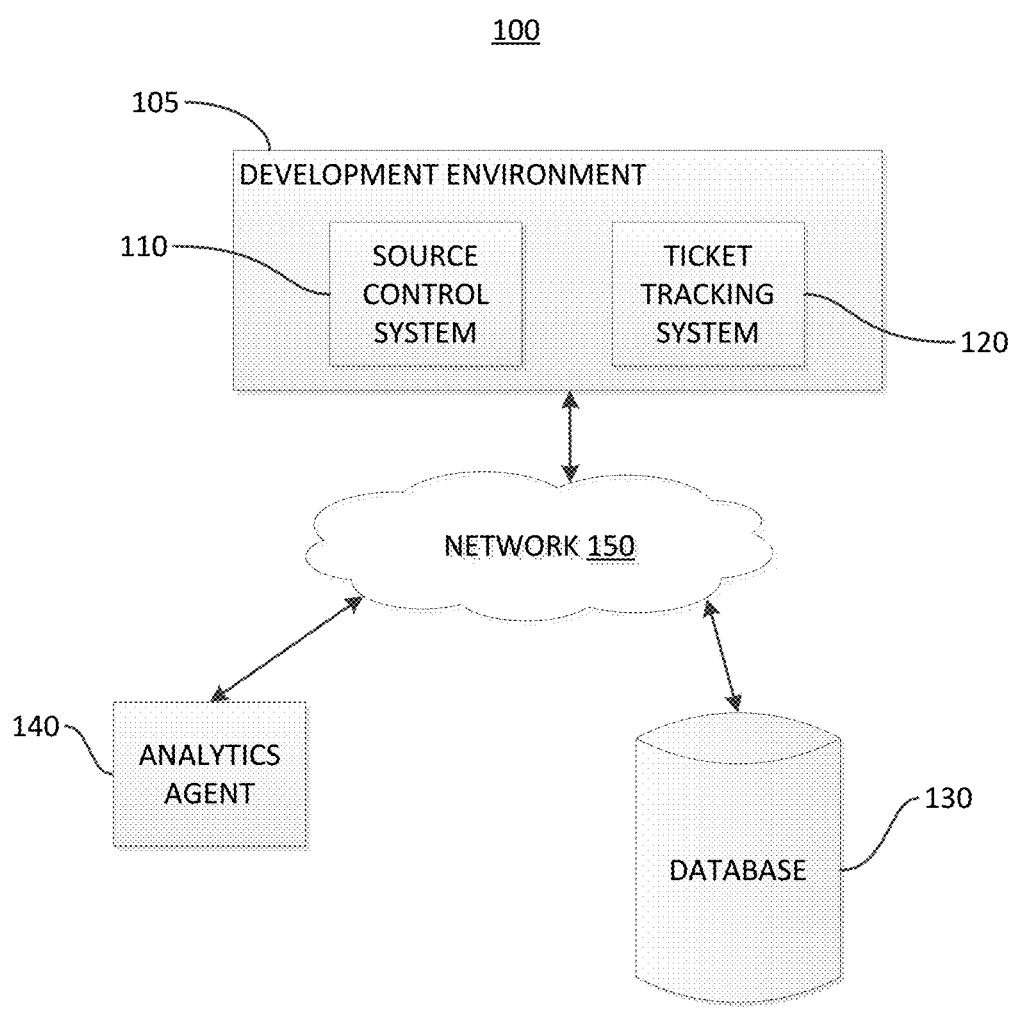
FIG. 1 illustrates an example system for predicting code errors, according to one embodiment.

FIG. 1 illustrates a computing environment. As shown, system 100 includes a development environment 105, a source control system 110, a ticket tracking system 120, a database 130, and an analytics agent 140, that communicate over network 150. Development environment 105 enables developers to work collaboratively on projects, and includes a source control system 110 that manages code files, and the ticket tracking system 120 that documents program defects and their resolution. Source control system 110 manages changes to the source code files of a computer program as software developers add features and revise existing features. Source control system 110 assigns a revision number to code material added to the system, i.e., the initial revision for new code is "revision 1", and source control system 110 increments the revision number each time a change is made. Each revision is assigned a timestamp and an identifier for the software developer who checked in the revision. Source control system 110 is configured to allow revisions to be compared and previous revisions to be restored.

When a new revision is created, source control system 110 assigns the identifier of the developer adding the revision to the new or modified lines of code in the revision. The identifier, therefore, indicates the developer who "owns" the code changes made in the revision. For example, if a developer Alex creates a new software feature that includes a new file "greatstuff.java" and modifies ten lines of an existing file "main.java" to incorporate the new feature, then when "greatstuff.java" is added to source control system 110 it will be assigned "revision 1" and all of the lines in the file will be assigned Alex's developer identifier. When "main.java" is checked into source control system 110, its revision number will be incremented, i.e., increased from 4 to 5, for example, and the ten lines that Alex modified will be assigned Alex's developer identifier. The other lines of "main.java" that were not modified retain the developer identifier previously assigned by source control system 110. Source control system 110 performs a line by line comparison of a newly added revision and the prior revision of a file to identify modified or new lines of code in the file.

Ticket tracking system 120 records and tracks defects in software. When a defect is discovered in the software, ticket tracking system 120 creates a new record to document the defect and its resolution. After ticket tracking system 120 assigns the defect to developer, ticket tracking system 120 maintains metadata about the defect, such as the time the developer spends making the fix, a narrative from the developer describing the defect and its solution, and a categorization of the defect, i.e., pointer error, memory error, recursion error, etc. Once the defect has been fixed by the assigned developer, ticket tracking system 120 accesses the source control system to obtain the developer identifier of the files modified in the revision, and assigns that developer as the originator of the defect. Ticket tracking system 120 also records the lines of code that were changed by the fixing developer. Once the defect has been resolved by the fixing developer, ticket tracking system 120 stores the record of the defect and the related metadata in database 130.

Analytics agent 140 analyzes the defect records and related metadata from database 130 and the code related to each defect to generate a model for estimating the frequency and types of defects in new software features. For example, analytics agent 140 identifies data elements from defect records in the ticket tracking system 120 and database 130 describing the defect repaired in each record. Analytics agent 140 uses the data elements describing the defects to describe output elements for the machine learning agent, i.e., if the defect was described as a recursion error then analytics agent 140 identifies "recursion error" as a type of error that a machine learning technique can predict. Analytics agent 140 can identify elements from enumerated types selected by the developer who repaired the defect, or by extracting descriptive terms from a narrative description written by the fixing developer. For instance, the fixing developer can write a summary of a recursion defect as "error in recursive base case" or "problem in recursive terminating case." Analytics agent 140 extracts the term "recursive" as an element because the term appears in both narrative descriptions and describes the general nature of the defect. Analysis agent 140 analyzes the source code revisions related to the defect records to identify code structures and software developer identifiers to use as input elements for the machine learning techniques. Thus, analysis agent 140 uses elements describing defects, code elements, and developer identifiers with machine learning techniques to predict defects in software elements.

Figure 2:
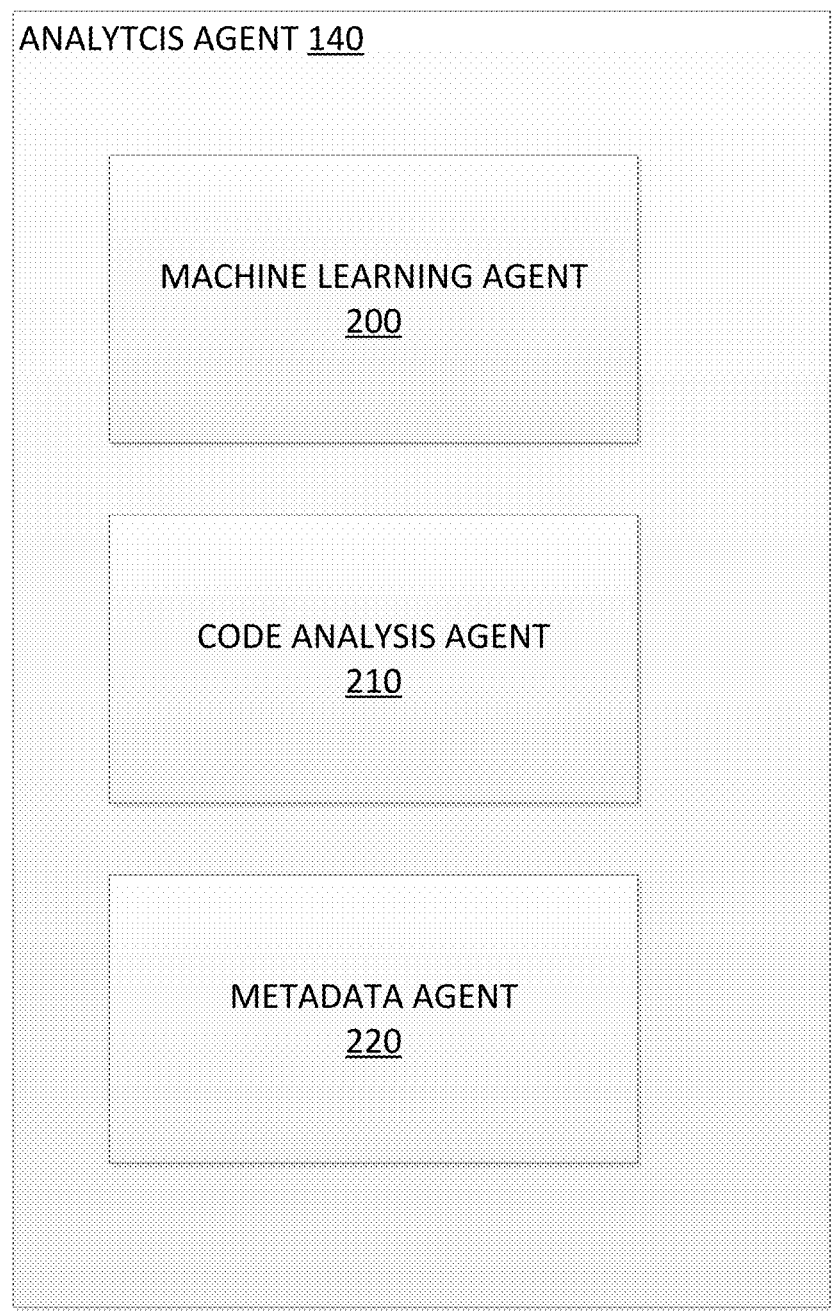
FIG. 2 illustrates a block diagram of an analytics agent, according to an embodiment.

FIG. 2 illustrates an analytics agent 140 according to an embodiment. As shown, analytics agent 140 includes a machine learning agent 200, a code analysis agent 210, and a metadata agent 220.

Machine learning agent 200 predicts the number of software defects expected to be present in new software features and predicts the most effective developers for resolving development defects. Machine learning agent 200 uses the elements from the code analysis agent 210 and metadata agent 220 to predict errors in software. Machine learning agent 200 uses machine learning techniques to predict error in software based on documented errors from defect tickets and the related source code files. Examples of machine learning techniques include neural networks, naïve bayes, k-nearest neighbors, and decision trees/Random Forest™. Machine learning techniques often require training data from which the machine learning technique analyzes to refine the technique's prediction model, i.e., the system "learns" from the past records. The training data represents individual example cases that the machine learning technique uses to generate more accurate predictions. Machine learning agent 200 receives a set of data elements that it uses with the machine learning technique to prepare to generate predictions.

Metadata agent 220 retrieves defect records from database 130 and generates a data element set for the machine learning agent 200. Metadata agent 220 can create a data element set based on all defect records in database 130 or on subsets of records, such as, by way of example, defect records from a range of dates, defect records related to specific software programs, or defect reports related to a specific type of error. The records used by metadata agent 220 can be configured by the user to tailor the predictions made by machine learning agent 200. Metadata agent 220 processes defect records generate the set of elements used as input and output elements of the machine learning algorithm. For example, the element set for a Naïve Bayes algorithm, which makes predictions based on a number of elements where each element is assumed to be unrelated to the presence of any other element, identifies which elements will be included in the comparison. For a neural network, data elements are used as input elements or output elements. That is, by extracting an element set, metadata agent 220 identifies the elements that the machine learning technique will search for in the input data and the elements that the machine learning technique will include in the output data, i.e., the predictions.

Metadata agent 220 generates elements using defined fields from the defect records, such as the identifier of the originating developer, the identifier of the fixing developer, enumerated defect classifications, and terms extracted from any included narrative. To generate elements from a narrative, i.e., a written description of the defect created by the developer who fixes the error, Metadata agent 220 selects terms from the narrative by filtering a dictionary of terms from all records using a statistical analysis such as Chi squared, information gain, or correlation coefficient scores. Metadata agent 220 combines the elements extracted from the defect records in database 130 with elements identified by code analysis agent 210.

Code analysis agent 210 generates a element set by analyzing the portions of code containing a defect and the code modified to fix the defect. Code analysis agent 210 receives a set of defect records from metadata agent 220 being used to create the data set. Code analysis agent 210 extracts the source code revisions related to the defect, i.e., revision containing the defect and the revision containing the fix, and the listing of modified code lines. Code analysis agent 210 retrieves the files with the modified code lines from both revisions and parses the files to identify the code structures related to the defect. For example, if the modified code lines appear within a recursive method, then the code analysis agent 210 generates recursion as an element. If the modified code appears in error handling, then the code analysis agent 210 generates error handling as an element. Code analysis agent 210 generates a collection of code elements as it processes each of the collection of defect records and, for each record, adds any identified code elements to the defect record. Once code analysis agent 210 has processed the defect records, the collection of code elements are provided to the metadata agent 220. In an alternative embodiment, the code elements are filtered to remove statistically insignificant elements from collection.

Metadata agent 220 receives the code element collection from the code analysis agent 210 and combines the collection with the element set generated by the metadata agent 220 to create a composite element set. The composite element set is providing to the machine learning agent 200, which configures the machine learning algorithm's input elements and output elements using the elements in the composite element. Machine learning agent 200 trains the algorithm using the record set identified by metadata agent 220. Once the machine learning agent 200 completes the training process, the machine learning agent 200 is prepared to process software features.

Machine learning agent 200 processes a software feature by generating a prediction of the number and type of defects in the software. Machine learning agent 200 uses elements from the composite element set as input elements, such as the developer identifiers and code elements, while using other composite elements as outputs, such as the type of defect and defect probability. Code analysis agent 210 processes the code of the software feature to identify the code elements present in the software element. Once the code elements present in the software have been identified by the code analysis agent 210, machine learning agent 200 uses the identified code elements, developer identifiers, and other input elements to generate a prediction using the machine learning technique. In an embodiment using elements related to the repair of the a defect as input elements, such as the developer identifier and time required for the repair, the prediction generated by the machine learning agent 200 includes recommendation for the developer to assign for defect repairs. The defect repair recommendation can be for a specific developer identifier or through comparative scoring of multiple developers, i.e., an output rating of Alex at 0.8, Beth at 0.65, and Chris at 0.6 on a 0.0-1.0 scale identifies Alex as the most effective.

In an alternative embodiment, code analysis agent 210 generates a element set every time a defect in ticket tracking system 120 is resolved. In this embodiment, code analysis agent 210 retrieves the source code files of the revisions related to the defect that was fixed, parses the files to identify the code elements related to the defect, and generates a list of the code elements. The code elements are stored with the defect record. In this embodiment, the metadata agent 220 receives the code elements as part of the defect records selected for the data set.

Figure 3:
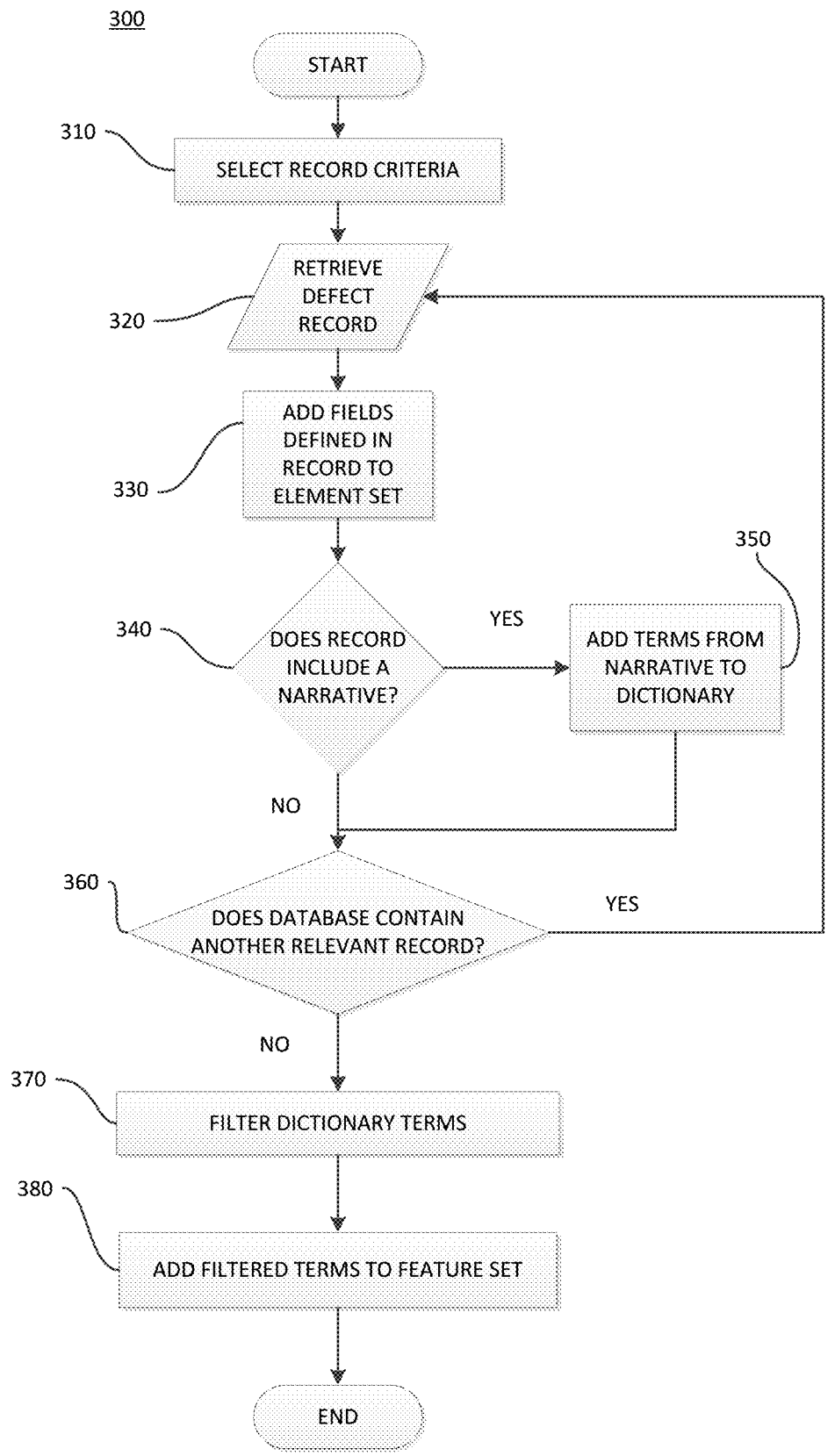
FIG. 3 is a flow chart a process for extracting data elements from defect records, according to one embodiment.

FIG. 3 is a flow chart illustrating a process for extracting data elements from defect records. Process 300 is performed by metadata agent 220, and begins at step 310 by selecting the criteria used to identify defect records to use in the process. In step 320, the criteria are used to retrieve a relevant defect record from database 130. In step 330, the fields from the record are added to the element set. For example, for a record with the fields "originating developer" and "fixing developer," containing the developer identifier for the software developer who created the defect and the developer identifier for the software developer who fixed the defect, the "originating developer" and "fixing developer" fields would be added to the element set. In step 340, the record is analyzed to determine if it includes a narrative, such as a written description of the defect and the repair made by the fixing developer, and when it does the process moves to step 350, which adds the terms from the narrative to a dictionary. In step 360, the metadata agent 220 determines if database 130 includes additional relevant records using the criteria selected in step 310. If database 130 does include additional relevant records, the process returns to step 320 where the next relevant record is retrieved and processed through steps 330, 340, and 350. When all of the relevant records have been retrieved from database 130, the process proceeds from step 360 to step 370, where the dictionary populated with the terms from the relevant defect records is filtered to generate a collection of statistically significant terms. At step 380, the significant terms are added to the element set.

Figure 4:
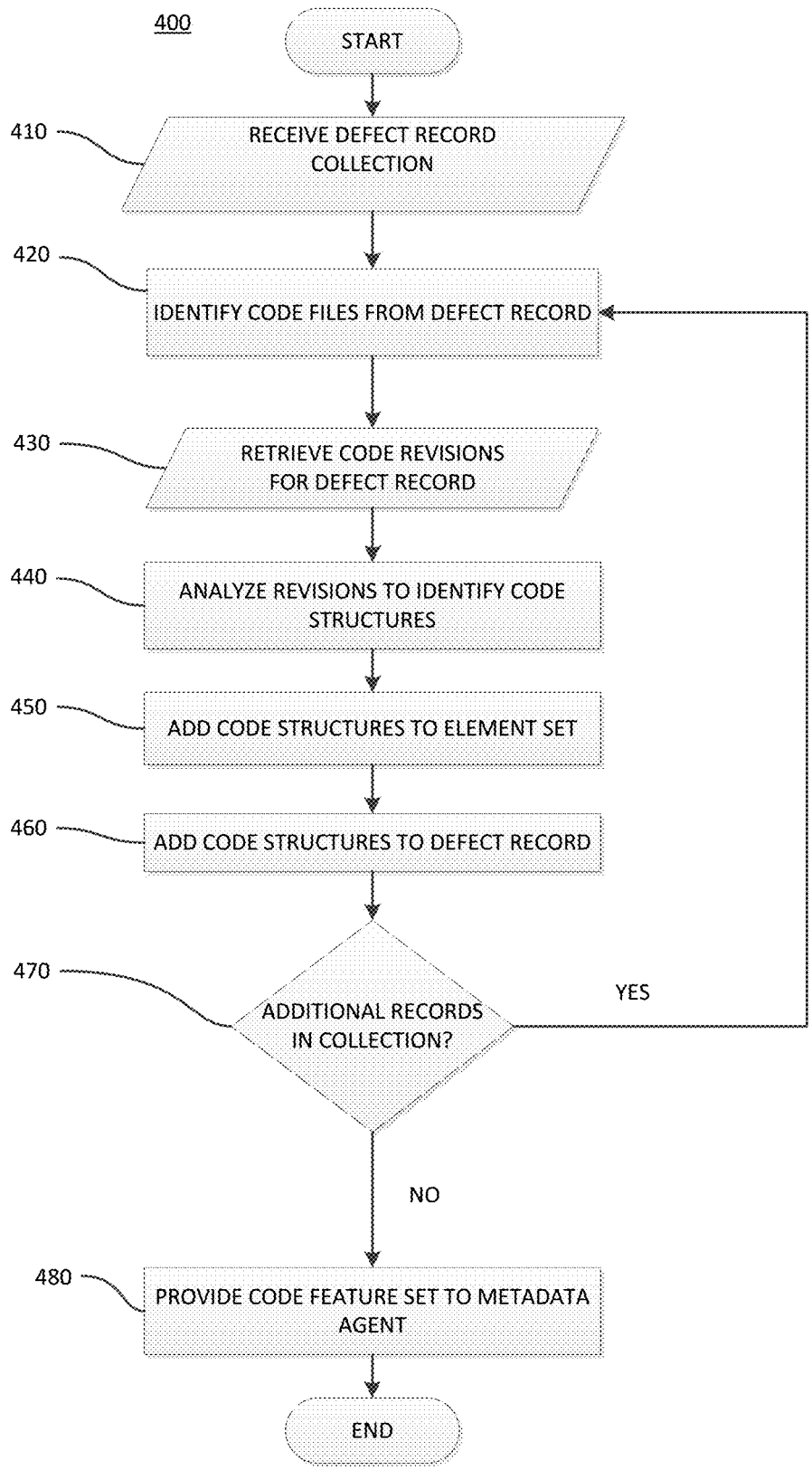
FIG. 4 is a flow chart illustrating a process for extracting code elements using defect records, according to one embodiment.

FIG. 4 is a flow chart illustrating for extracting code elements using defect records. Process 400 is performed by code analysis agent 210, and begins at step 410 by receiving a collection of relevant defect records from metadata agent 220. At step 420, the source code files related to a defect record are identified, i.e. the files modified as during the defect fix. At step 430, code analysis agent 210 retrieves the source code files from the code revisions related to the defect record, i.e., the code revision for the defect fix and the preceding code revision containing the defect. At step 440, the two revisions are analyzed to identify code elements related to the defect, either as part of the defect or as part of the repair, and at step 450, the code elements are added to the element set. At step 460, the code structures identified in step 440 are added to the defect report record.

Figure 5:
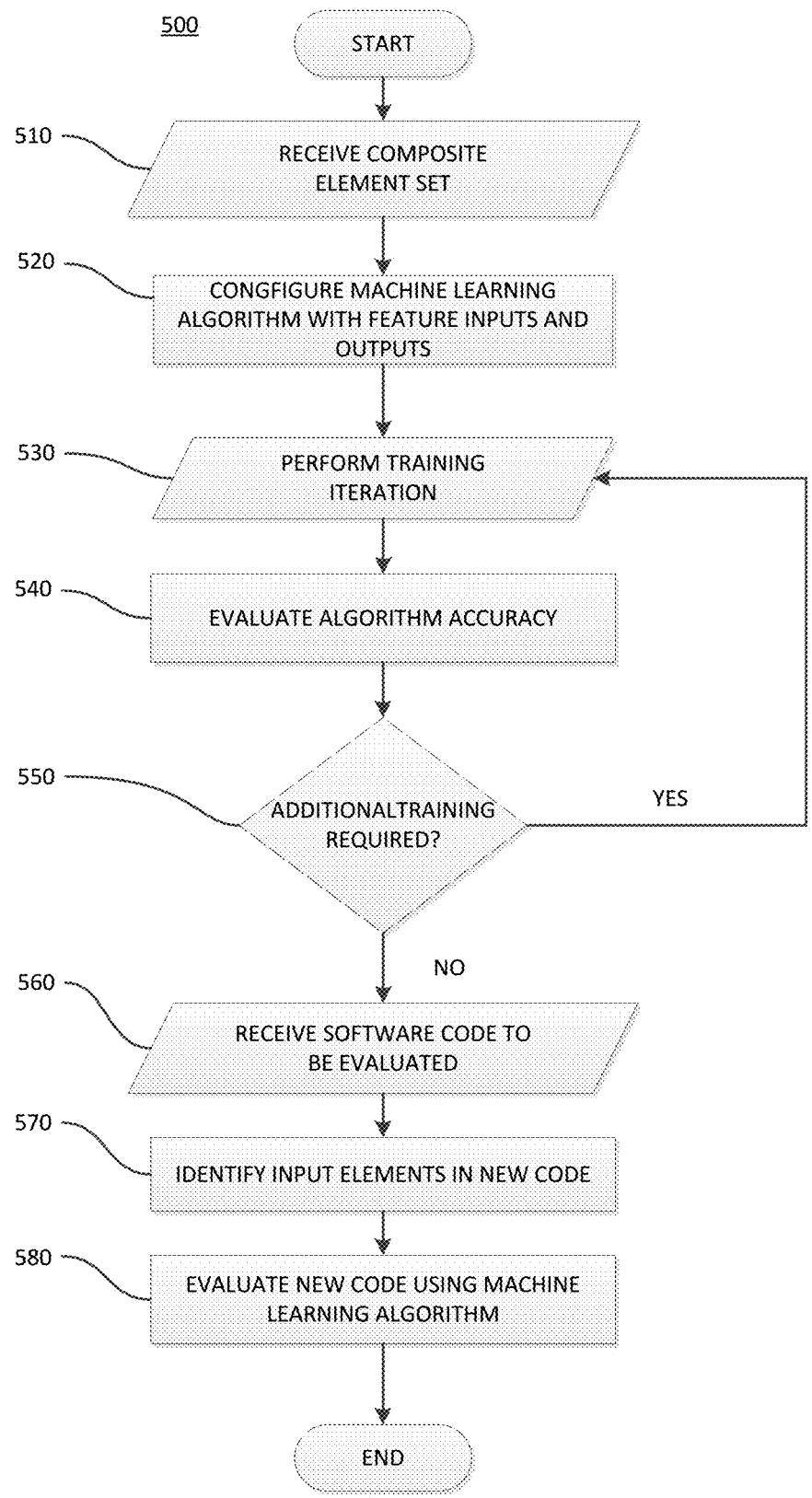
FIG. 5 is a flow chart illustrating a process for evaluating new software elements, according to one embodiment.

FIG. 5 illustrates a method for evaluating new software features, according to an embodiment. As shown, process 500 begins at step 510 where machine learning agent 200 receives the composite element set from metadata agent 220. At step 520, machine learning agent 200 configures the machine learning algorithm with elements from the element set. For instance, when configuring a neural network, machine learning agent 200 selects elements to use as inputs into the network and elements that will be in the results from the neural network analysis. Input elements include, for example, the identifiers of the developers who wrote the code and code elements from the composite element set. Output elements include, for example, enumerated defect types and narrative terms from the composite element set. At step 530, machine learning agent 200 trains the machine learning algorithm using one or more defect reports as training data. For instance, machine learning agent 200 retrieves a relevant defect report, retrieves the code revisions related to the defect report, and evaluates the code of the revision prior to the defect fix with the neural network to generate an output set. Multiple defect reports can be evaluated to generate a larger output set. In step 540, the results in the output set are evaluated by comparing the generated results to the data in the defect report, i.e., did the result set predict the defect that was actually present? After evaluating the output set, machine learning agent 200, at step 550, determines whether additional training is required to achieve greater accuracy. If so, the process returns to step 530 to perform additional training. Once machine learning agent 200 determines that the machine learning algorithm does not require additional training, the machine learning agent 200 proceeds to step 560 where it receives the source code for the software element to be evaluated. At step 570, machine learning agent 200 uses code analysis agent 210 to receive a set of code elements present in the software, which are used as input values for the machine learning algorithm. In step 580, machine learning agent 200 evaluates the software using the input values to generate a result set. The result set includes elements from the composite element set with a prediction for each element, i.e., how likely the element is to be in the software.

Figure 6:
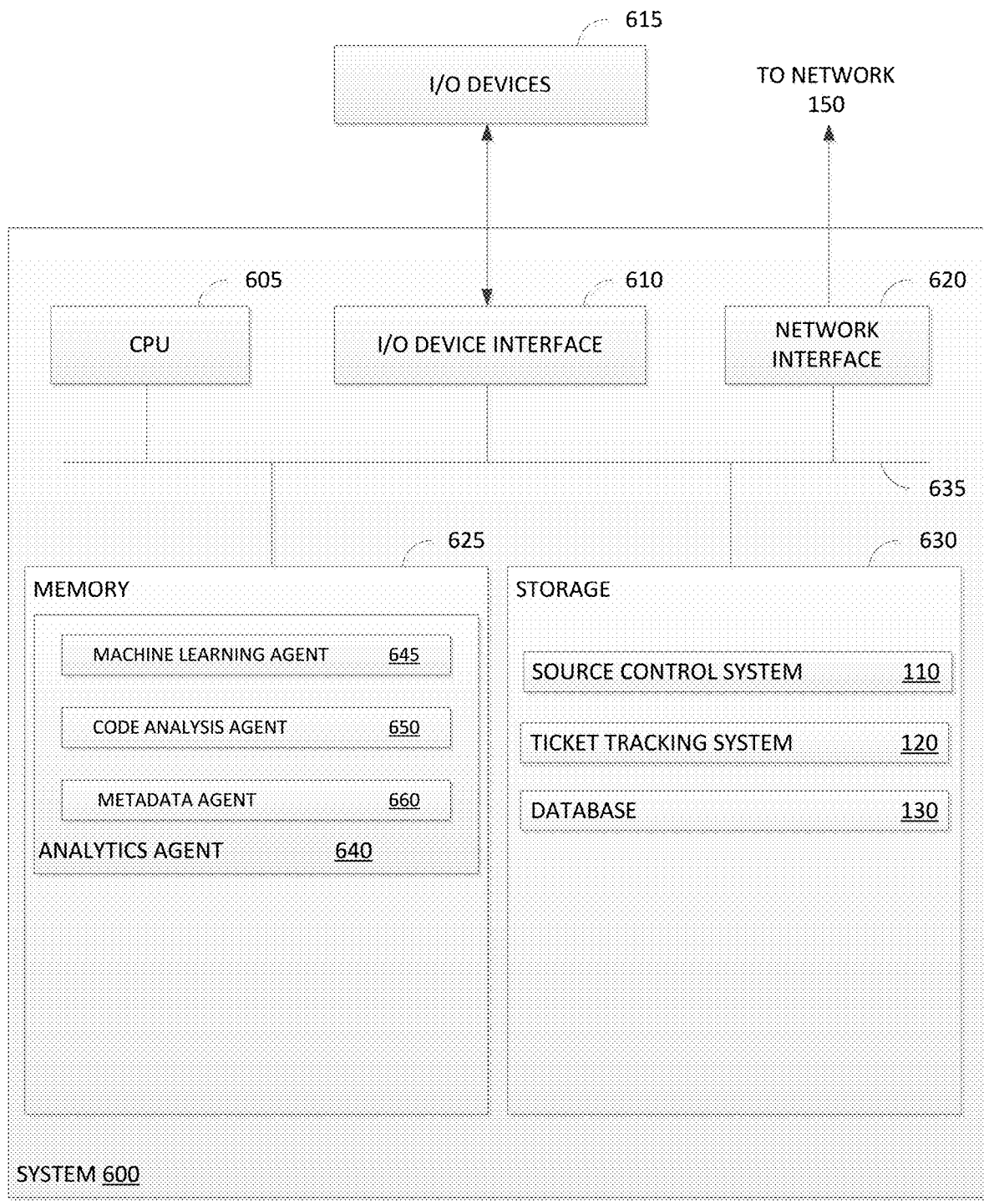
FIG. 6 illustrates an example computing system for predicting code errors, according to one embodiment.

FIG. 6 illustrates an example computing system for generating predictive analysis of software. As shown, the system 600 includes, without limitation, a central processing unit (CPU) 605, one or more I/O device interfaces 610 which may allow for the connection of various I/O devices 615 (e.g. keyboards, displays, mouse devices, pen inputs, etc.) to the system 600, network interface 620, a memory 625, storage 630, and an interconnect 635.

CPU 605 may retrieve and execute programming instructions stored in the memory 625. Similarly, the CPU 605 may retrieve and store application data residing in memory 625. The interconnect 635, transmits programming instructions and application data, among the CPU 605, I/O device interface 610, network interface 620, memory 625, and storage 630. CPU 605 is included to be representative of a single CPU, multiple CPUs, a single CPU having multiple processing cores, and the like. Additionally, the memory 625 is included to be representative of a random access memory. Furthermore, the storage 630 may be a disk drive, solid state drive, or a collection of storage devices distributed across multiple storage systems. Although shown as a single unit, the storage 630 may be a combination of fixed and/or removable storage devices, such as fixed disc drives, removable memory cards or optical storage, network attached storage (NAS), or a storage area-network (SAN).

As shown, memory 625 includes analytics agent 640 including a machine learning agent 645, a code analysis agent 650, and a metadata agent 660. Machine learning agent 645 is generally configured to evaluate software using a machine learning algorithm. Code analysis agent 650 and metadata agent 660 generate element sets from source code files and defect reports, respectively. A composite element set including elements from code analysis agent 650 and metadata agent 660 is used by machine learning agent 645 to configure the machine learning algorithm to evaluate a software element. Code analysis agent 650 retrieves revisions of source code files from source control system 110 in storage 630, and analyzes the files to generate a set of code elements. Metadata agent 660 retrieves defect reports from database 130, ticket tracking system 120, or both, and analyzes the reports to generate an element set. The element sets from code analysis agent 650 and metadata agent 660 are combined into a composite element set used by machine learning agent 645.

Machine learning agent 645 sets up the machine learning algorithm input elements and output elements by selecting elements from the composite elements set. Machine learning agent 645 uses code analysis agent 650 to generate a code elements present in the software being evaluated, and uses those code elements with developer identifiers to evaluate the software using the machine learning algorithm. The output from the machine learning algorithm includes values for the selected output elements, including potential defects, i.e., enumerated types, and a likelihood that the defect will be present.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for evaluating source code comprising:
   identifying a first defect record related to a first defect in a software application;
   receiving a first code revision by a first developer repairing the first defect by modifying at least one code line of the software application;
   recording, in the first defect record, that the first developer fixed the first defect;
   analyzing the at least one code line of the software application and a plurality of defect records, including the first defect record, to determine training data;
   training a machine learning model, using the training data, to recommend a particular developer for repairing a second defect in a software feature based on input elements related to the software feature; and
   selecting the particular developer from a plurality of developers to repair the second defect in the software feature based on an output from the machine learning model in response to the input elements related to the software feature, wherein the training data includes training inputs comprising code elements.

2. The method of claim 1, further comprising:
   generating a programming code structure from the first code revision; and
   recording the programming code structure in the first defect record.

3. The method of claim 1, further comprising: training the machine learning model, using the training data, to predict types and numbers of defects in software features based on the input elements related to the software features.

4. The method of claim 1, wherein the training data includes training outputs comprising developers.

5. The method of claim 1, wherein the machine learning model is a neural network.

6. The method of claim 1, wherein determining the training data comprises analyzing metadata associated with the plurality of defect records.

7. A system, comprising:
   a processor; and
   memory storing instructions which, when executed on the processor, cause the processor to perform a method for evaluating source code, the method comprising:
      identifying a first defect record related to a first defect in a software application;
      receiving a first code revision by a first developer repairing the first defect by modifying at least one code line of the software application;
      recording, in the first defect record, that the first developer fixed the first defect;
      analyzing the at least one code line of the software application and a plurality of defect records, including the first defect record, to determine training data;
      training a machine learning model, using the training data, to recommend a particular developer for repairing a second defect in a software feature based on input elements related to the software feature; and
      selecting the particular developer from a plurality of developers to repair the second defect in the software feature based on an output from the machine learning model in response to the input elements related to the software feature, wherein the training data includes training inputs comprising code elements.

8. The system of claim 7, wherein the method further comprises:
   generating a programming code structure from the first code revision; and
   recording the programming code structure in the first defect record.

9. The system of claim 7, wherein the method further comprises: training the machine learning model, using the training data, to predict types and numbers of defects in software features based on the input elements related to the software features.

10. The system of claim 7, wherein the training data includes training outputs comprising developers.

11. The system of claim 7, wherein the machine learning model is a neural network.

12. The system of claim 7, wherein determining the training data comprises analyzing metadata associated with the plurality of defect records.

13. A non-transitory computer-readable medium comprising instructions which, when executed by one or more processors, performs a method for evaluating source code, the method comprising:
   identifying a first defect record related to a first defect in a software application;
   receiving a first code revision by a first developer repairing the first defect by modifying at least one code line of the software application;

recording, in the first defect record, that the first developer fixed the first defect;

analyzing the at least one code line of the software application and a plurality of defect records, including the first defect record, to determine training data;

training a machine learning model, using the training data, to recommend a particular developer for repairing a second defect in a software feature based on input elements related to the software feature; and selecting the particular developer from a plurality of developers to repair the second defect in the software feature based on an output from the machine learning model in response to the input elements related to the software feature, wherein the training data includes training inputs comprising code elements.

14. The non-transitory computer-readable medium of claim 13, wherein the method further comprises:

generating a programming code structure from the first code revision; and recording the programming code structure in the first defect record.

15. The non-transitory computer-readable medium of claim 13, wherein the method further comprises: training the machine learning model, using the training data, to predict types and numbers of defects in software features based on the input elements related to the software features.

16. The non-transitory computer-readable medium of claim 13, wherein the training data includes training outputs comprising developers.

17. The non-transitory computer-readable medium of claim 13, wherein the machine learning model is a neural network.

* * * * *